United States Patent [19]

Steinbock

[11] Patent Number: 4,923,323
[45] Date of Patent: May 8, 1990

[54] THREADED TYPE FASTENER

[76] Inventor: Rolf H. Steinbock, 128 Grienbrier Dr., Carnegie, Pa. 15106

[21] Appl. No.: 270,226

[22] Filed: Nov. 14, 1986

[51] Int. Cl.⁵ .............................................. B25G 3/00
[52] U.S. Cl. .................................... 403/261; 403/16; 411/941; 411/305
[58] Field of Search ............... 411/432, 396, 399, 300, 411/324, 295, 294, 941, 941.1, 941.3, 271, 325, 393; 403/261, 16

[56] References Cited

U.S. PATENT DOCUMENTS

| | | | |
|---|---|---|---|
| 401,044 | 4/1889 | Marshall | 411/306 |
| 599,783 | 3/1898 | Hogan | 411/946 X |
| 1,128,104 | 2/1915 | Carrico et al. | 411/941 X |
| 1,963,536 | 6/1934 | Trotter | 411/306 |
| 2,202,928 | 6/1940 | Shaw | 411/305 |
| 2,758,625 | 8/1956 | Poupitch | 411/946 X |
| 4,136,989 | 1/1979 | Bianco | 403/261 |
| 4,622,730 | 11/1986 | Steinbock | 411/432 X |

FOREIGN PATENT DOCUMENTS 620698  8/1978  U.S.S.R. ............... 411/271

Primary Examiner—Andrew V. Kundrat
Attorney, Agent, or Firm—Clifford A. Poff

[57] ABSTRACT

A fastener for use where a predetermined holding force of holding position is to be maintained while the fastener is required to exert a holding force less than the full maximum force it is capable of exerting, the fastener having a shaft portion that threadedly fits into a nut, the shaft portion having an angular cut forming a spring like member, with an outer projecting portion biased toward a surface of the nut for causing a resistance to rotation of the fastener relative to the nut, and wherein the nut may take the form of a thrust collar that receives a number of the fasteners for maintaining a bearing on a journal.

10 Claims, 3 Drawing Sheets

THREADED TYPE FASTENER

BACKGROUND OF THE INVENTION

The invention relates to an improved threaded fastener, for example, a bolt or screw and more particularly to the type of a bolt employed in what is generally referred to as a torque nut. Ever since the first use of threaded fasteners there has been suggested numerous ways and means for preventing the inadvertent loosening of the fastener relative to the piece being secured thereby. The very traditional known "lock" washer would be a well recognized example. Another example would be the cutting of a slot into the free end of a bolt where the slot extends coaxially into the center of the bolt.

Even though many of these, and other similar devices and constructions worked reasonably well in certain applications there are certain applications where there exists a real need for an improved means or construction for preventing the fasteners from turning in either direction and losing their desired position and in some cases pre-set critical fastening force or holding power.

An example of such a fastener where the need of an improved locking means may be useful is the torque screw type fastener employing torque nuts of the type illustrated in U.S. Pat. No. 4,622,730. One of the many applications of the torque nuts disclosed in this patent is to secure a roller bearing to the journal of a shaft such as the work roll of a rolling mill.

These bearings are not only very large expensive items but may operate under extremely high load conditions and speeds and wherein during operation there is a great concern that the bearing be kept from over heating. One of the contributing factors of over heating of the bearing is the degree of "tightness" with which the bearings are held on their journals. While it is required that the bearings be held very firmly, they can not be held so firmly so as to create excessive frictional generated heat leading to early bearing failure.

To add to the difficulty, the system with which the bearing is employed and the bearing itself is continuously subject to thermal expansion and dynamic vibrations. Thus there exist a serious need to provide in this and many other cases a screw type fastener useful in a situation where the member being fastened is subject to vibrations and thermal expansion, which will allow a pre-set fastening power or holding position to be maintained. The holding force required may be anywhere between 0 and 100 percent of the maximum holding force the fastener is capable of exerting, but which will still be prevented for turning and hence disturbing the pre-set fastening force.

It should be noted that while the torque nuts of the type disclosed in the aforesaid patent are designed not to come loose and remain tight on vibrating on pulsating equipment this is on the general assumption that the nuts have been fully torqued.

SUMMARY OF THE INVENTION

It is the object of the present invenion to provide an improved threaded type fastener, either for example as a single standard fastener or as one or more of the pre-stressed nuts and bolts of the mechanical stress bolt type fasteners of the aforesaid patent.

More particularly, it is an object to provide in combination with a threaded bolt an integral specially designed part or a separate independent part or element that will engage a portion of the bolt in a manner to prevent inadvertent relative rotation between the bolt and the member being held thereby, for use in an application where the bolt is to be maintained in a desired position relative to the member and/or to exert a desired pre-set holding force or power on the member.

It is still a further object to form the integral part as an axially extending sloped cut in the outer surface of the threaded or non-threaded portion of the bolt to form a spring like member adopted to forcefully contact a portion of the member being held to prevent relative rotational movement between the two elements, or in the alternative as to the separate independent part, in place of the spring like member an independent spring biased member or a bar spring can be used to carry out the same objectives.

SUMMARY OF THE DRAWINGS

The present invention can be better understood when the accompanied description is read along with the following drawings, of which.

DETAIL DESCRIPTION OF THE INVENTION

Figure 1:
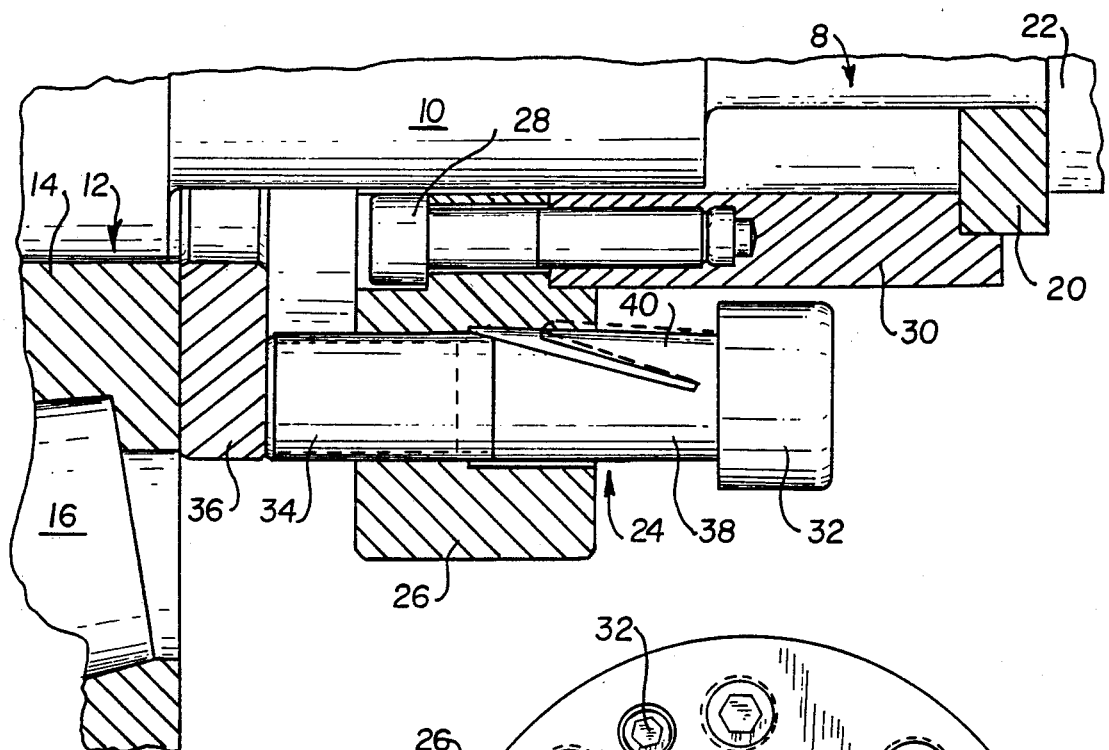
FIG. 1 is a partial sectional view of a trust collar assembly employed to retain a bearing on a journal of a rolling mill roll and employing the features of the invention.

With reference first to FIG. 1, there is shown a portion of a rolling mill roll 8, more particularly of a journal portion 10 thereof and the outer axial portion of a well known roller bearing 12 employed to rotatably support the roll. The portion of the bearing shown consist of an inner race 14, one of the rollers of the bearing 16 and an outer race 18. While not shown, the end of the roll 8 terminates immediately to the left of a ring 20, which can be made in the form of a well known split ring, mounted on a reduced portion of the roll, the ring forcibly engages a collar portion 22 of the roll.

Between the split ring 20 and the inner race 14 a thrust collar assembly 24 is provided to secure in a desired manner the bearing 12 to the journal portion 10 of the roll. The assembly included a thrust collar 26 mounted concentrically with respect to the adjacent neck portion of the roll and having two bolt circles, the holes of the inner one receiving several equally spaced apart bolts 28, the inner threaded ends thereof being threadedly secured in a spacer ring 30 having its outer circumferencial end portion with a circular enlarged end portion for engaging the split ring 20 by two perpendicular surfaces, one being a load or thrust transferring surface.

In the radially outward bolt circle, the thrust collar 26 is provided with a number of equally spaced holes for receiving a number of standard bolts 32 that function as torque jack bolts of the type disclosed in the aforesaid U.S. Pat. No. 4,622,730. In the illustrated case the roll journal portions has a diameter of 23½ inches and a inner race of a 23 inches diameter in its inner most axial portion.

The shaft portion of each bolt 32 is formed with separate axial portions, the outer most portion 34 having a threaded connection with the adjacent portion of the thrust collar 26, the portion that extends away from the collar engaging a thrust ring 36 having its opposite end in thrust or load transferring contact with the inner race 14 of the bearing 12. In this way, according to the teaching of U.S. Pat. No. 4,622,730 on the torquing of the bolts 32, the bolts are pre-stressed a pre-determined amount between the bearing and the roll which pre-stressing force holds the bearing on the roll by a predetermined force.

The inner shaft portion 38 of each bolt is provided with a sloped opening, such as formed by a saw cut, extending from the front of the inner shaft portion 20 towards the rear thereof but terminating adjacent the head portion of the bolt and before the cut intersects the center axis of the bolt. This construction forms a spring like member 40 having a projecting outer circular face that forcefully engages a similar inner circular cooperative face of the thrust collar 26, the contact tending to collapse the spring like member as indicated in comparing the full line position with the dash line position in FIG. 1.

This construction allows the jack bolts to be tightened or torqued to a degree less than their maximum torque so that the bearing can be held with a desired holding force, but not to the extent of creating over heating in the context discussed above, and wherein the spring like members 40 of the bolts will insure that the bolts will not inadvertently turn even though they are not tight or under any load.

Figure 2:
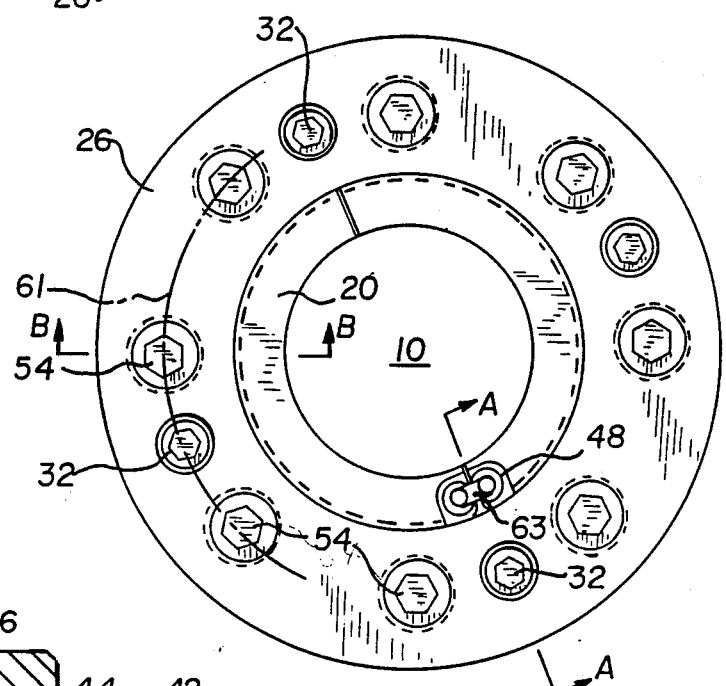
FIG. 2 is a partial end view showing a roll journal-thrust collar arrangement according to a second embodiment of the invention.
Figure 3A:
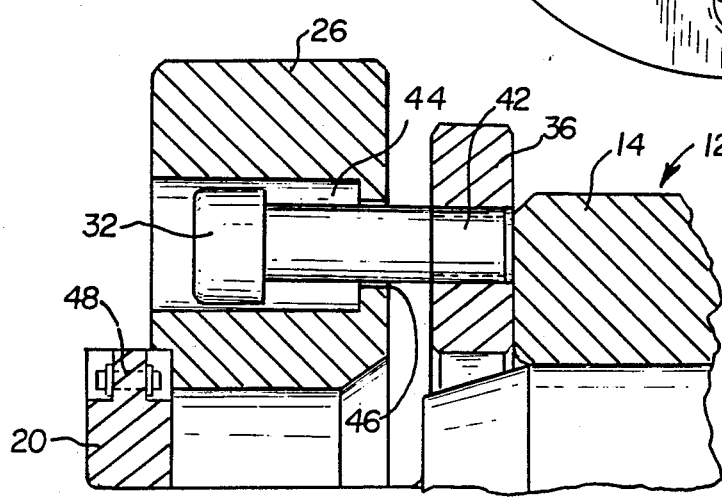
FIG. 3A is a section view taken along lines A—A of FIG. 2.
Figure 3B:
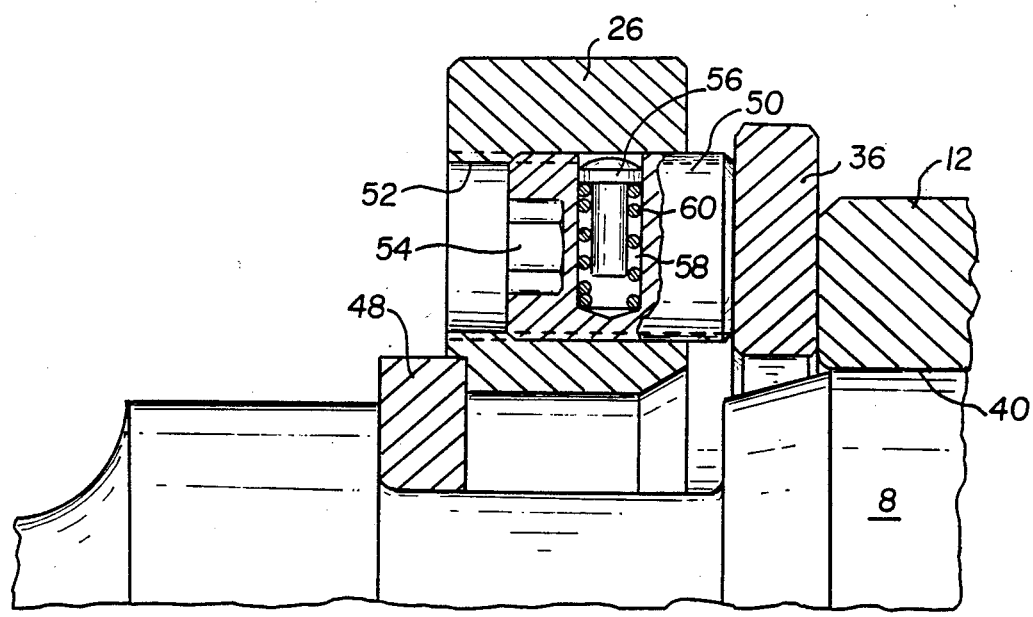
FIG. 3B is a section view taken along lines B—B of FIG. 2.

The embodiment of FIGS. 2, 3A, and 3B is similar in function and principle to the embodiment of FIG. 1, but is designed to accommodate a bearing holding arrangement where the distance between the bearing and roll end is much smaller than what is shown in FIG. 1. For this reason like part in FIG. 1 will have similar reference members in FIGS. 2, 3A, and 3B and only one jack bolt and guide bolt will be described, it being understood that the other similar bolts are identical. In this second embodiment and in referring first to FIG. 3A the ring 36 is provided with a threaded portion 42 to threadedly receive the outer end of guide bolts 32. The thrust collar 26 has a two part bolt opening, identified as 44 and 46, the head of the bolt being received within the portion 44 while the center portion thereof passes through the part 46 of the opening. While not fully shown, in the construction of FIG. 2 and about which more will be discussed below, the thrust collar transfers its pre-stressed force to the ring 48, which in this embodiment takes the form of a split ring.

It will be appreciated that the thrust ring 36 is only held against the inner race 14 of the bearing 12 by the guide bolts 32 and is allowed to "float" since it is not physically connected to the thrust collar 26 and the guide bolts are allowed to freely move relative to the thrust collar.

In the second embodiment, with reference first to FIG. 3B, as noted above the thrust collar 26 is designed to accommodate a "short" thrust collar design, however, the collar is provided with a set screw pre-stress jack design instead of standard employed bolts as jack bolts. In this case a set screw 50 takes the place of the jack bolts and is threadedly engaged with the thrust collar 36 by threaded hole 52 formed internally in the collar, the outer end of the which has a set screw opening 54, the inner end engaging the ring 36 in a thrust transferring manner. As noted in FIG. 3B, the outer end of the thrust collar engages the spring ring 48 to transfer the pre-stress force of the set screw to the roll 10. Instead of the spring like member 40 of FIG. 1, there is provided for each set screw a button 56 received in an opening 58, the button being biased outwardly by a spring 60 that fits around the lower shaft portion of the button and wherein the outer portion of the button forcefully contacts the adjacent inner part of the collar 26 to hold it against inadvertent rotation.

It will be appreciated that in some bearing securing constructions it may be desired to back off the set screw screws 50 from contact with the ring 36 to a pre-set holding and/or restraining position with respect to the bearing 12, in which case the ring will be allowed to move axially relative to the bearing since the guide bolts are permitted to move relative to the thrust collar 26.

Turning now to FIG. 2, which is an outside view of the end facing the heads of the guide bolts 32 and jack set screws 54, there is illustrated a common bolt circle 61 the circumferential positions of the two different bolts, there being shown several equally spaced jack set screws 54 and several equally spaced guide bolts. Also shown in FIG. 2, is a link type fastener 63 for the split ring 48.

Figure 4:
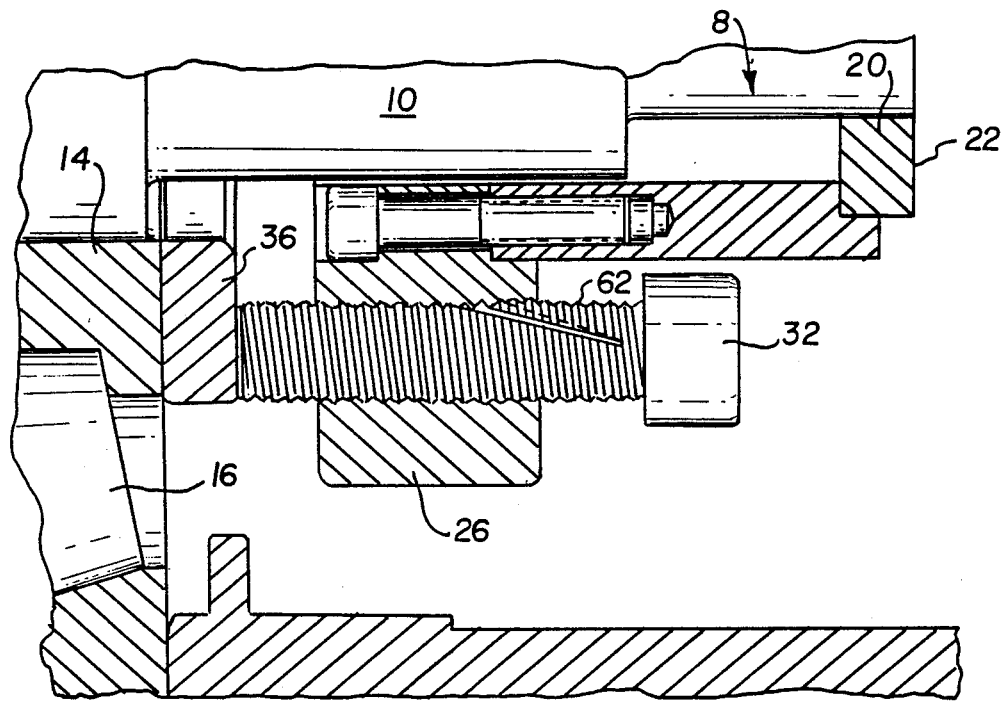
FIG. 4 is a view, similar to FIG. 1, of a third embodiment of the invention.
Figure 5:
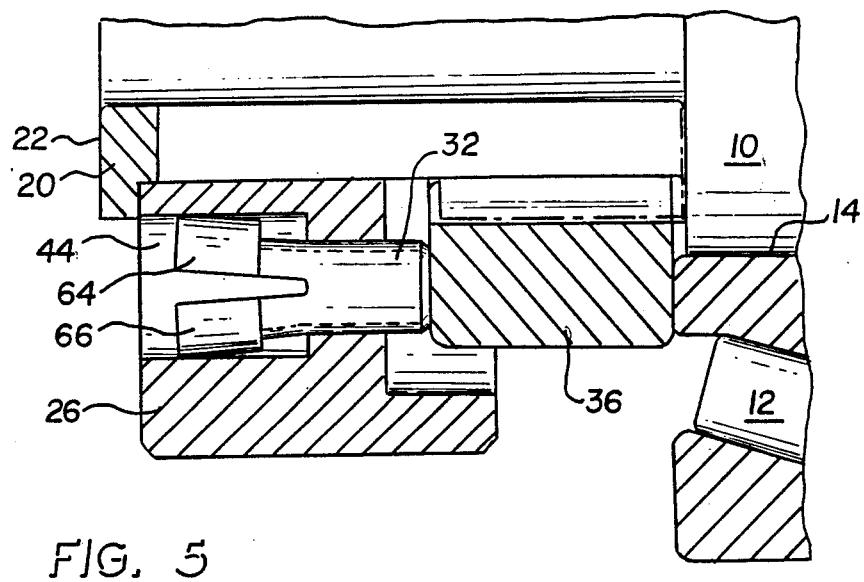
FIG. 5 is a view, similar to FIG. 1, of a fourth embodiment of the invention.

The embodiments of FIGS. 4 and 5, are the same in principle and function as the embodiment of FIG. 1, FIG. 5 illustrates the opposite end of the roll, similar parts appearing in FIG. 1 have been marked with similar reference numbers. In FIG. 4 the jack bolts 32 instead of having an non-threaded inner portion, the threads are extended the full length of the shaft portion of the bolts. The spring like members 62 forcefully engages the adjacent threaded portions of the thrust collar 36 to hold the jack bolts against inadvertent turning.

In FIG. 5 the spring like member of each bolt takes the form of a two piece head of the torque jack bolt, the two pieces being indicated at 64 and 66, in which their outer axial portions most adjacent to the inner portions of the collar 26 forcefully contact the collar to prevent inadvertent rotation of the bolt.

Figure 6:
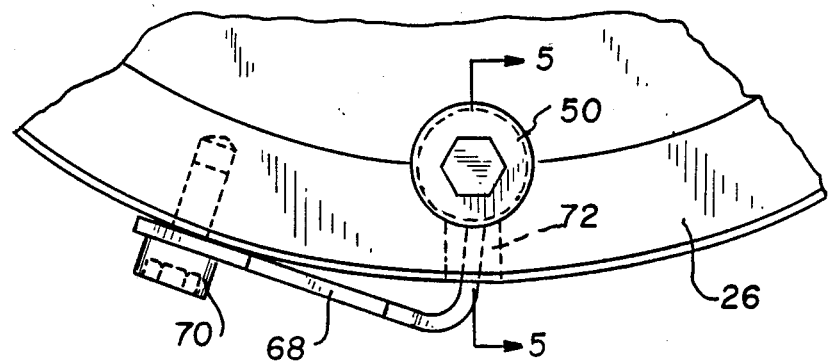
FIG. 6 is an outside view and FIG. 7 a partial sectional view of a fifth embodiment of the invention.
Figure 7:
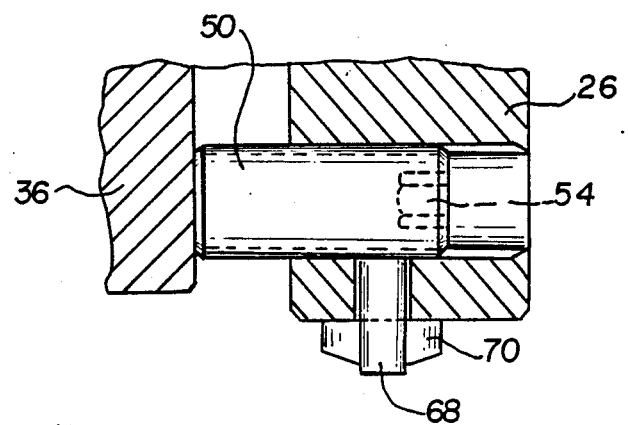

Turning now to the last embodiment and to FIGS. 6 and 7, this embodiment is similar in function and principle to the embodiment of FIG. 1 and again similar parts of FIG. 1 are identified with similar reference numbers. Instead of the spring biased button of each torque jack set screws shown in FIG. 3, an external spring member is provided for each set screw in the form of a tension bar 68 having one end positioned and secured to the thrust collar 26 by a bolt-washer unit 70 and having its hooked shaped other end arranged to pass through an opening 72 to forcefully engage an adjacent portion of the set screw 50, as best shown in FIG. 6, to thereby prevent undesired rotation of the set screw.

As earlier noted, while the invention has been shown and described in conjunction with several different forms of torque jack-set screw bolts for securing a roller bearing, in its broadest aspects it is meant to relate to a single fastener, such as a standard bolt-nut, or set screw used for any usual purpose. Thus the single bolt shown in the various embodiments of the drawings can be used as a single fastener as their present counterparts are now employed. In addition, as to the thrust collar embodiments shown and described, the invention can be modified from the forms shown and employed for different purposes without deporting from the scope and spirit of the invention.

I claim:

1. A thrust collar assembly for securing a bearing to a journal of a shaft, comprising:
    a thrust collar arranged concentric to said journal between an adjacent end of said bearing and an axial portion of said shaft,
    a first and second group of holes formed in said collar, said groups being arranged on different concentric bolt circles,
    a first spacer ring arranged concentric with said shaft between said collar ad said axial portion of said shaft having one of its sides in a force transmitting relation with said axial portion and said collar,
    first group of fasteners received in said first group of holes for threadedly engaging one side of said first spacer ring,
    means for engaging another side of said first spacer ring with said axial portion,
    a second spacer ring arranged between the bearing and an adjacent side of said collar, and
    a second group of fasteners being of the torque jack type each received in a different one of said second group of holes of said collar and arranged to have a force transmitting relation with said second spacer ring and hence said bearing.

2. A thrust collar according to claim 1, wherein each said fastener includes a shaft portion having an opening along its axial length for forming as an integral part thereof a projection means with a free deflectable end constructed and arranged to act as a spring like member biased towards an adjacent surface of said collar for causing a resistance to rotation of said second group of fasteners relative to said collar.

3. A thrust collar according to claim 1, said collar for each fastener having an opening arranged perpendiculaly to the axis of said fastener,
    said opening extending between an associated said fastener and the outside of said collar, and
    external spring like means for each opening having a first end secured to the outside surface of said collar and a second end constructed to pass into said opening to forcibly engage said fastener for causing a resistance to rotation of said fastener relative to said collar.

4. A thrust collar assembly for securing a bearing to a journal of a shaft, comprising:
    a thrust collar arranged concentric to said journal between an adjacent end of said bearing and an axial portion of said shaft,
    a group of holes formed in said collar arranged concentric to said shaft on a bolt circle,
    a first spacer ring arranged concentric with said shaft and between said collar and said axial portion of said shaft having one of its sides in a force transmitting relation with said shaft portion and said collar,
    a second spacer ring arranged between the bearing and the adjacent side of said collar, and
    a group of fasteners being of the torque jack type each received in a different one of said group of holes having their inner ends in a force transmitting relation with said second spacer ring and said bearing 5. A thrust collar according to claim 4, wherein each said fastener includes a shaft portion having an opening along its axial length for forming as an integral part thereof a projection means with a free deflectable end constructed and arranged to act as a spring like member biased towards an adjacent surface of said collar for causing a resistance to rotation of said group of fasteners relative to said collar.

6. A thrust collar according to claim 5, wherein each said fasteners of said group takes the form of a set screw.

7. A thrust collar according to claim 6, wherein each said set screw has an opening arranged perpendicularly to the axis of said set screw and having an open end adjacent a portion of said collar,
    displaceable means received in said opening adapted to move through said open end thereof, and
    means for biasing said displaceable means into forcible contact with said adjacent portion of said collar for causing a resistance to rotation of said set screw relative to said collar.

8. A thrust collar according to claim 7, wherein each said set screw includes a head portion located at one of its ends,
    further wherein said opening of at least one said set screw is formed in said head portion thereof in a manner to form two said projection means, and
    said collar including a non-threaded portion formed as an axial extension of the threaded portion of said collar, the arrangement being such that said two projection means are caused to engage said non-threaded portion of said collar.

9. A thrust collar according to claim 4, including guide means received in openings formed in said collar for supporting said guide means in a manner to allow relative movement between said collar and said guide means,
    said guide means having end means for engaging said second spacer ring in a manner to allow said second spacer ring to move axially of said shaft relative to said bearing and said collar to the extent permitted by said inner ends of said fasteners.

10. A fastener including a shaft portion having threads that pass into and are threadedly engaged by a cooperative nut,
    said nut having an opening arranged to the axis of said shat portion,
    said opening extending between said shaft portion and the outside surface of said nut,
    external spring like means having a first end secured to the outside surface of said nut and a second end constructed to pass into said opening to forcibly engage said shaft portion for causing a resistance to rotation of said shaft portion relative to said nut,
    wherein said spring like means takes the form of a spring bar,
    said first end including a portion extending away from said opening and along said nut,
    said extending portion being arranged to be free to be displaceable away from said nut and dimensioned, including having a length substantially longer than that of said second end, to create a spring lever effect for said second end, and
    means for securing said first end to said nut.

* * * * *